Aug. 26, 1958   R. E. BASTIAN   2,848,910
TIRE MOLDS AND METHOD OF MAKING SAME
Filed March 22, 1955   2 Sheets-Sheet 1
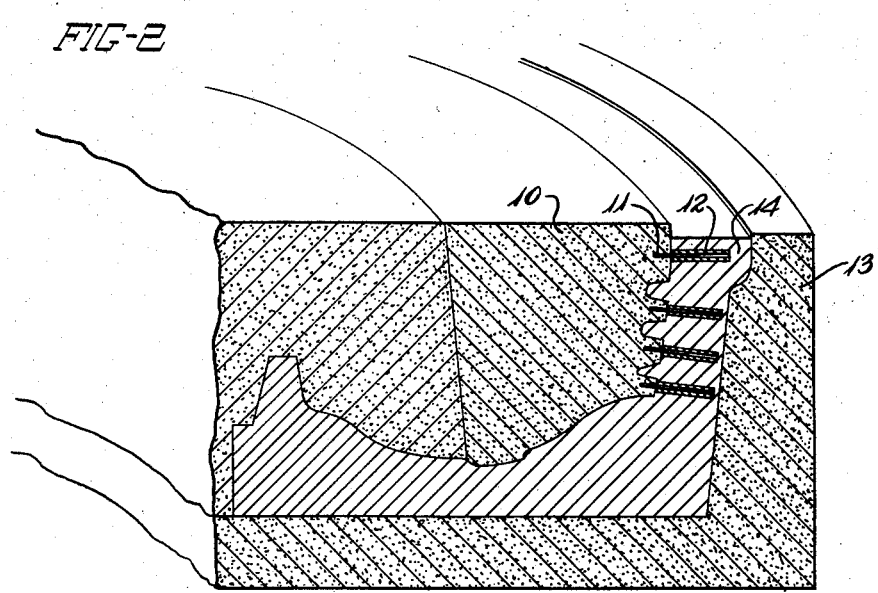
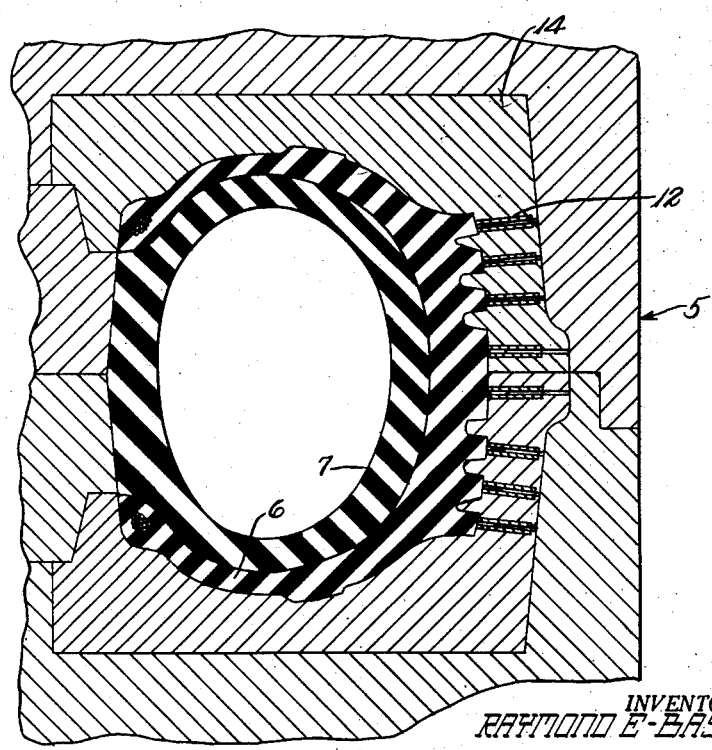
INVENTOR.
RAYMOND E. BASTIAN
BY
W. A. Fraser
ATTY- INVENTOR.
RAYMOND E. BASTIAN
BY W. A. Fraser
ATTY.

United States Patent Office 2,848,910
Patented Aug. 26, 1958

2,848,910

TIRE MOLDS AND METHOD OF MAKING SAME

Raymond E. Bastian, Akron, Ohio, assignor to The Firestone Tire & Rubber Company, Akron, Ohio, a corporation of Ohio Application March 22, 1955, Serial No. 495,838

5 Claims. (Cl. 76—107)

This invention relates to an improved method of making an annular mold, and particularly to an improved method of making a mold for rubber tires having a tread of either a circumferentially repetitive or non-repetitive design.

One of the operations during construction of a pneumatic tire consists of placing an uncured tire in a suitable mold and simultaneously applying heat and internal pressure for a sufficient time to effect the desired molding and vulcanization of the tire.

In accordance with conventional tire mold practice, a mold of the circumferentially split type is usually formed from two substantially identical mold sections adapted, when complementally engaged, to define an annular cavity for receiving a green or uncured tire therein to mold the desired tread design thereon as it is vulcanized in the mold.

The present invention is illustrated in relation to a method of making molds disclosed in United States Patent No. 2,560,052 issued to John L. Miller and John R. Boughter June 1, 1951 to which patent reference is had for details of casting tire molds with which applicant's invention is useful. It is to be understood, however, that the invention is not to be limited to the particular method described by said patent and that it applies to any method of making molds in which it may be found useful.

A mask of a tire or a section thereof will be referred to as a "positive" mold, while a shell type mold having a surface complementary to a tire mask will be termed a "negative" or tire mold. The finished tire mold may be a casting of suitable material such as aluminum, brass, cast iron, or other metal alloys and the present invention relates to a method of making such tire molds. The positive mold section employed in producing the negative mold sections may, for example, consist of a plaster, sand, and asbestos fiber mixture molded in arcuate sections and adapted to be combined to form a complete annulus referred to herein as a tire mold.

Pneumatic vehicle tires have intricate anti-skid tread patterns and the tire mold in which such tires are molded has complementary tread patterns. As is well known by those familiar with molding tires, difficulty is experienced from air trapping in the tread design in the mold as the green or unvulcanized tread rubber of the tire is forced between the mold configurations that compose the tread design. If the trapped air does not escape before the tire is vulcanized, improper molding of the tire tread where the air is trapped results.

To reduce improper molding caused by trapped air, tire manufacturers vent the tire molds. Such vents comprise holes approximately 1/16" in diameter which heretofore have been drilled into the molds. These vent holes open on the molding surface of the mold at the areas in which trapping of air would or is most likely to occur if a vent is not present. The vent holes extend through the wall of the tire mold to the atmosphere which necessarily is through a substantial depth of metal. A 700–15 passenger automobile tire of ordinarily intricate design will usually be provided with several hundred vents.

Before the present invention said mold vents were drilled by a power drill manually manipulated. The drilling required much time and skill.

An object of the present invention is to provide a cast tire mold having vent holes formed therein during the casting of the mold.

Another object of the invention is to reduce the time and skill normally required to provide a tire mold with vent holes.

A further object of the invention is to provide a method of making tire molds that include locating and casting the desired vent holes in the mold simultaneously with the casting of the body of the mold and thereby avoid all or a substantial part of vent hole drilling heretofore required. Other objects will become apparent to persons skilled in the art upon examination of the drawings, description and claims appended thereto.

In the drawings in which like parts are identified by the same reference numerals throughout, Fig. 1 is a sectional view of a tire mold embodying the present invention and shown with a tire and curing bag as they appear after the tire is molded and before the mold is opened to remove the tire and curing bag.

Fig. 2 is a fragmentary perspective view partly in section of a positive plaster mold and back sand core or cope with one half of a tire mold cast about vent tubes mounted on mandrels or pins projecting from said positive mold.

Figure 3:
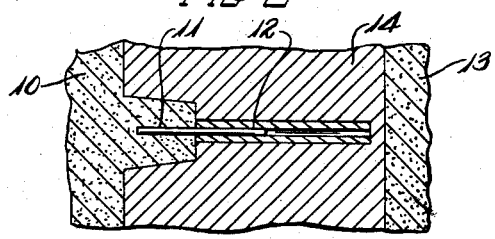
Fig. 3 is a fragmentary sectional view showing a single mandrel and vent tube of Fig. 1 drawn to a larger scale.
Figure 4:
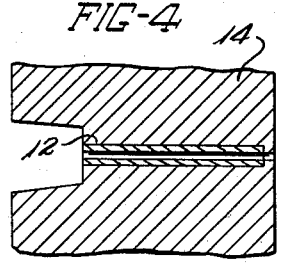
Figure 5:
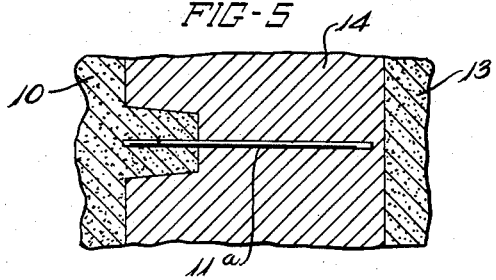
Figure 6:
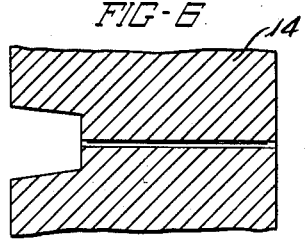

Fig. 4 is the same as Fig. 2 showing the mold with the vent tube cast therein as it will appear after the positive core, sand cope and mandrel have been removed and the vent hole through the tube extended through the mold wall by drilling, and Figs. 5 and 6; 7 and 8; 9 and 10 are similar to Figs. 2 and 3, but illustrating modified steps of casting the vent tubes in the wall of the tire mold.

Referring now to Fig. 2 the first step in making a mold embodying the present invention is forming a positive mold or mask 10 of a tire to be molded. This mask may be formed in accordance with the method set out in the patent referred to herein before. The next step is to insert mandrels or pins 11 in mold 10 at predetermined locations, such as shown in the drawings, the mandrels being so inserted as to permit a length of mandrel to project laterally outwardly from the core 10. Small metal tubes 12 are next mounted on the projecting end of the mandrels, the hole in the tubes in relation to the size of the mandrel being such that the tubes have sufficient frictional contact with the mandrel to retain them in position on the mandrels during the mold casting operation. With the tubes 12 in position on mandrels 11 the core 10 is laid in a back cope 13 preparatory to casting the mold 14 of said suitable material in any satisfactory manner such, for example, as set out in the above identified patent. It is to be noted that one end of the tubes 12 fit snugly against the radial outer surface of the core 10 and that as shown in Fig. 2 the tubes extend radially outwardly toward the cope 13 but are spaced a short distance therefrom. After the mold portion 14 has been poured, cooled and hardened the core 10 is broken and removed after which the mandrels 11 are drawn from tubes 12 leaving the tubes embedded in the body of the tire mold 14. Cope 13 is then removed after which the holes in tubes 12 are extended through the wall of the mold 14 by drilling through the bore of the tubes and through the wall of the mold to the radially outer surface of the tire mold 14. It will be seen that it is only necessary to insert the drill into tubes 12 and drill through any metal in the bore and through a thin wall of metal to reach the outer surface of the tire mold thereby providing the vent holes through which air may escape to the atmosphere when a tire is molded and vulcanized in mold 14 as illustrated in Fig. 1. Obviously, the distance the tubes are spaced from the outside cope 13 during the casting of the mold 14 may be reduced until only a very thin layer of material or metal forming the mold 14 will separate the end of the tubes 12 from the outside surface of mold 14. Obviously, little time and skill is required to drill a thin layer of metal between the tubes and the outside surface of the mold 14.

Referring now to Figs. 5 and 6, there is illustrated another embodiment of the present invention wherein the vent hole is cast in the tire mold by omitting the tubes 12 from a mandrel or pin 11a and the mandrel 11a is utilized to form the vent hole in the tire mold. In this embodiment the length of the mandrel 11a is increased over mandrel 11 so that it extends to a point closely spaced from the outside surface of the mold 14. After mold 14 is cast as explained in connection with Fig. 2 the core 10 is broken away and removed after which the pins 11a are forcibly pulled from the tire mold 14 leaving a hole through which a drill is inserted and the metal in the wall of the tire mold at the end of the hole is drilled through to the outside surface of the mold 14 as shown in Fig. 6.

Figure 7:
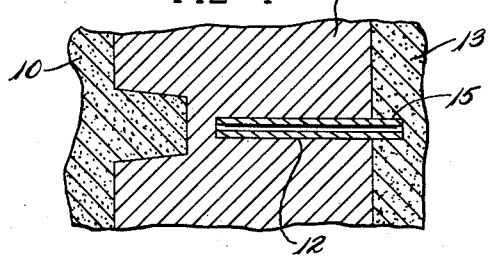
Figure 8:
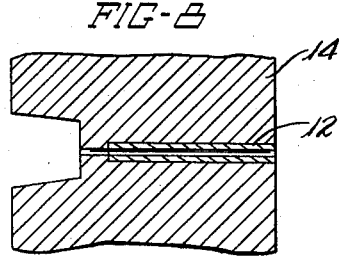

The embodiment of the invention illustrated in Figs. 7 and 8 includes the step of inserting the tubes 12 in the back cope 13 at predetermined points to locate vents as desired. The next step is to insert the core 10 and pour the metal or material to form the tire mold 14 thereby casting the tubes 12 in the tire mold. Next the core 10 and cope 13 are broken away and the projecting ends 15 of tubes 12 is machined off flush with the outside surface of mold 14 after which a drill is inserted in the hole in tubes 12 and any metal that has flowed into the tube and the layer of mold material between the ends of the tubes and the radially inner surface of mold 14 is drilled through thereby providing the desired vent hole as will be seen by reference to Fig. 8.

Figure 9:
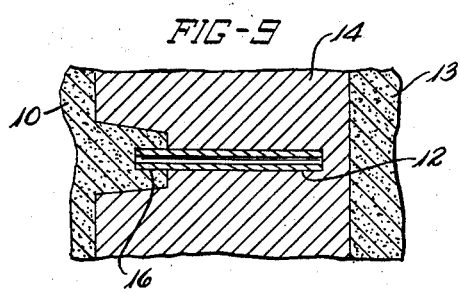
Figure 10:
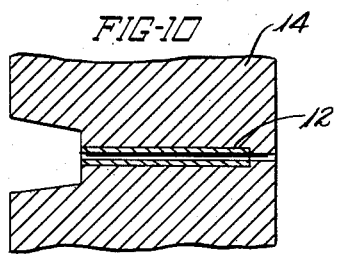

Another embodiment of the invention is disclosed in Figs. 9 and 10 this embodiment being substantially the reverse of that illustrated in Figs. 7 and 8. In this latter embodiment the mandrels employed in embodiment shown in Fig. 3 are omitted and the ends of the tubes 12 are inserted in the core 10 at predetermined points where vent holes are desired. The tubes project radially outwardly into the space between outer cope 13 and inner core 10 to a point near the radially inner surface of cope 13. With tubes 12 projecting as just explained the mold 14 is cast about the tubes after which the core 10 and cope 13 are broken away and the projecting end 16 of tubes 12 are machined off flush with the radial inner surface of the tire mold after which a drill is inserted in the tubes 12 and metal that may be entered the tubes and the layer of mold material between the outer ends of the tubes and the outer surface of the tire molds is drilled through to complete the vent hole as will be seen by reference to Fig. 10.

The present invention has been illustrated in connection with 4 embodiments thereof but it is to be understood that it is not to be limited to these particular embodiments. The invention includes all features of patentable novelty residing in the aforegoing description and the accompanying drawings.

What is claimed is:

1. A method of making a section of a metallic tire mold comprising providing a section of a positive mold member to be used for casting a section of a negative tire tread pattern, inserting end portions of supporting mandrels in said positive mold member at predetermined points so said mandrels extend radially outwardly therefrom, placing vent forming tubes on said mandrels, providing a back cope, disposing said positive mold member with said mandrels on said mandrels within said back cope leaving a chamber between said positive mold and said cope, and casting metal mold forming material in said chamber about said tubes, breaking away said positive mold and cope, removing said mandrels thereby providing an axial passageway through each said tube, and then drilling holes axially through said tubes and mold material to the radial outer surface of said tire mold section.

2. A method of making a section of a metallic tire mold comprising providing a section of a positive mold member to be used for casting a section of a negative tire tread pattern, inserting end portions of mandrels in said positive mold member at predetermined points, so said mandrels extend radially outwardly therefrom, providing a back cope, disposing said positive mold member with said mandrels within said back cope leaving a space between the positive mold members and the cope, and casting metallic mold forming material in said space about said mandrels, breaking away said positive mold and cope and pulling said mandrels from the cast mold material leaving holes therein, and then drilling a hole through mold material that separate the ends of said holes from the radially outer surface of said tire mold section, so that said drilled holes communicate with the holes formed by the withdrawal of said mandrels.

3. A method of making a section of a metallic tire mold comprising providing a section of a positive mold member to be used for casting a section of a negative tire tread pattern, providing a back cope, inserting end portions of vent forming tubes in said cope at predetermined points so said tubes extend radially inwardly, disposing said positive mold member within said back cope leaving a space between said positive member and said cope, and casting metallic mold forming material in said space about said tubes, breaking away said positive mold leaving said tubes in the mold material with ends of the tubes projecting radially outwardly from said cast material, removing said radially outwardly projecting ends of said tubes, and then drilling holes axially through said tube and mold material to the radially inner surface of said tire mold section.

4. A method of making a section of a metallic tire mold comprising providing a section of a positive mold member to be used for casting a section of a negative tire tread pattern, inserting end portions of vent forming tubes in said positive mold member at predetermined points so said tubes extend radially outwardly therefrom, providing a back cope, disposing said positive mold member with said tubes within said back cope leaving a space between said positive member and said cope, and casting metallic mold forming material in said space about said tubes, breaking away said positive mold leaving said tubes in the mold material with ends of the tubes projecting radially inwardly from said cast material, removing said radially inwardly projecting ends of said tubes, and then drilling holes axially through said tubes and mold material to the radially outer surface of said tire mold section.

5. A method of making a metallic tire mold comprising providing a positive mold member to be used for casting a negative tire tread pattern, providing a back cope, disposing said positive mold member within said back cope leaving a space between said positive member and said cope, supporting partial vent forming elements in said space and casting metallic material of which the tire mold is to be formed in said space about said elements, detaching said positive mold member and cope from said cast tire mold and drilling through said cast tire mold material to continue the vents formed by said elements entirely through said tire mold.

References Cited in the file of this patent

UNITED STATES PATENTS

| | | |
|---|---|---|
| 352,792 | Whitney | Nov. 16, 1886 |
| 1,019,506 | McCool | Mar. 5, 1912 |
| 1,179,155 | Bennett | Apr. 11, 1916 |
| 1,234,878 | Corvin | July 31, 1917 |
| 2,066,752 | Ward | Jan. 5, 1937 |
| 2,119,056 | Peterson | May 31, 1938 |
| 2,392,804 | Basolo | Jan. 15, 1946 |

FOREIGN PATENTS

| | | |
|---|---|---|
| 7,481 | Great Britain | Oct. 24, 1912 |